March 12, 1957 J. E. VERBLE 2,785,275
WARMER AND COOKER FOR CANNED FOODS
Filed Nov. 9, 1955 2 Sheets-Sheet 1
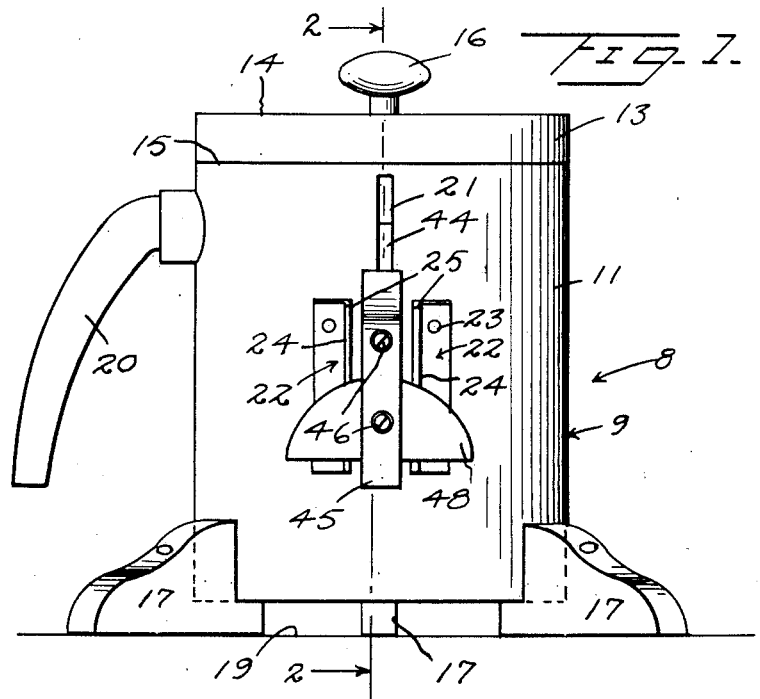
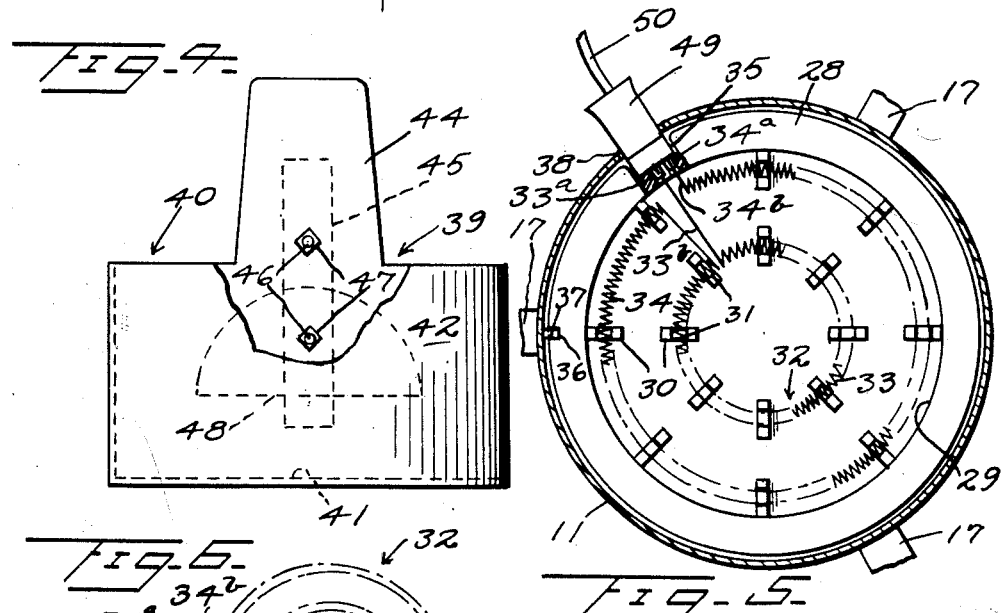
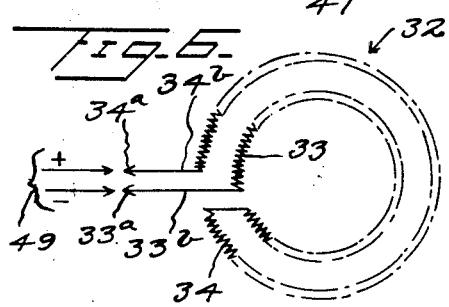
INVENTOR
J. E. Verble
BY John N. Randolph
ATTORNEY March 12, 1957 J. E. VERBLE 2,785,275
WARMER AND COOKER FOR CANNED FOODS
Filed Nov. 9, 1955 2 Sheets-Sheet 2
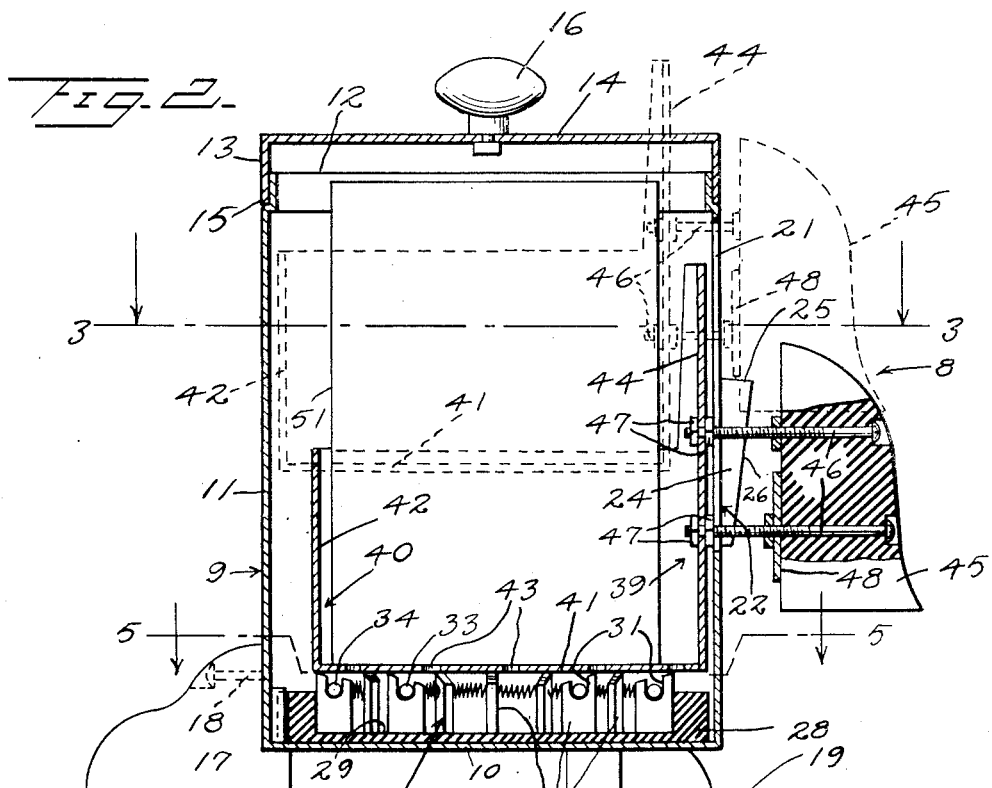
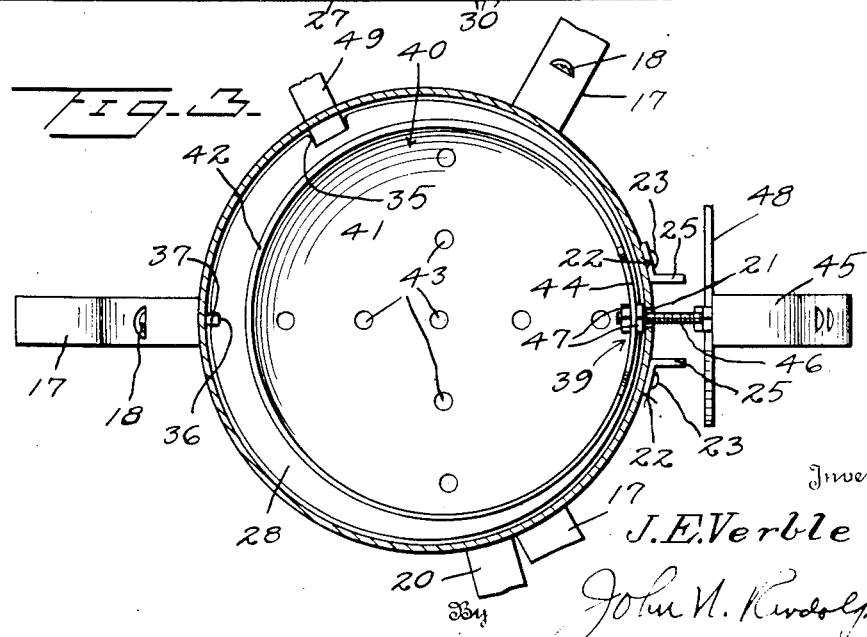
Inventor
J. E. Verble
By John N. Rudolph
Attorney

2,785,275

WARMER AND COOKER FOR CANNED FOODS

John E. Verble, Pueblo, Colo.

Application November 9, 1955, Serial No. 545,840

5 Claims. (Cl. 219—43)

This invention relates to a kitchen appliance for cooking or heating foods in the containers in which such foods are purchased and from which containers the cooked or heated food may be served directly onto plates, thus eliminating the use of separate cooking utensils.

An important object of the present invention is to provide a unit which will effect a substantial reduction in the washing of pots and pans normally employed for heating and cooking foods.

A further object of the invention is to provide a cooker and heater of extremely simple construction which may be efficiently employed for cooking and heating foods and which will save considerable time in preparing foods to be served.

Various other objects and advantages of the invention will hereinafter become more fully apparent from the following description of the drawings, illustrating a presently preferred embodiment thereof, and wherein:

Figure 1 is an elevational view of the cooker and heater shown with the parts positioned for use of the apparatus for cooking and heating foods;

Figure 2 is a vertical sectional view on an enlarged scale thereof, taken substantially along a plane as indicated by the line 2—2 of Figure 1;

Figure 3 is a cross sectional view of the apparatus taken substantially along a plane as indicated by the line 3—3 of Figure 2;

Figure 4 is an elevational view, partly broken away, of the elevatable platform unit, shown removed from the casing of the apparatus;

Figure 5 is a horizontal or cross sectional view of the cooker or heater, taken substantially along a plane as indicated by the line 5—5 of Figure 2, and Figure 6 is a diagrammatic view of the resistance element and electric circuit of the heating unit.

Referring more specifically to the drawings, the novel cooker and warmer or heater in its entirety and comprising the invention is designated generally 8 and includes a casing 9 preferably having substantially a flat bottom 10 and an upstanding wall 11 which is preferably cylindrical. The upper portion of the wall 11, defining the open top 12, may be of somewhat reduced diameter, as seen in Figure 2, to receive the depending annular flange 13 of a lid 14, the bottom edge of which is supported on the upwardly facing exterior shoulder 15, formed by the reduced upper portion of the wall 11. The lid 14 is provided with a centrally disposed upstanding knob or handle 16 which is preferably formed of a suitable heat insulating material.

The casing 9 is supported by a plurality of, preferably three, legs 17 which are secured thereto in any suitable manner as by fastenings 18, so that the legs 17 are equally spaced circumferentially around the casing 9. The legs 17, as seen in Figures 1 and 2, engage portions of the wall 11 and under portions of the bottom 10, so that the legs are resting on a supporting surface 19, the bottom 10 will be supported in an elevated position relative to said surface. A handle 20 is secured to a portion of the wall 11, beneath and adjacent the shoulder 15, and extends downwardly and outwardly therefrom and is adapted to be grasped for lifting and moving the unit 8. Said handle 20 and the legs 17 are also preferably formed of a suitable heat insulating material. The wall 11 is provided with a vertically elongated relatively narrow slot 21 which is circumferentially spaced from and interposed between two of the legs 17 and which is likewise spaced circumferentially from the handle 20. The handle 20 is preferably disposed at an angle of not more than 90° from the slot 21. A pair of brackets 22 are suitably secured as by fastenings 23 to the outer side of the wall 11, one on either side of the slot 21 and parallel thereto. The brackets 22 have outurned flanges 24 the upper edges of which define rests 25. The outer longitudinal edges 26 of the flanges 24 preferably converge downwardly with respect to the adjacent portions of the wall 11 from the rests 25, as best illustrated in Figure 2.

A heating unit, designated generally 27, is detachably mounted in the bottom portion of the casing 9 and includes a housing 28 preferably formed of heat insulating material having an upwardly opening recess 29 in which is secured a plurality of insulators 30 which are arranged in circumferentially spaced relation to one another and which preferably include an inner ring of such insulators and an outer ring, as best illustrated in Figure 5. The insulators 30 have upwardly opening notches 31. A heating element 32 in the form of an electric resistance wire has an inner ring portion 33 mounted in the notches 31 of the inner ring of insulators 30 and an outer ring portion 34 mounted in the notches of the outer insulators 30, as illustrated in Figures 2 and 5. As best seen in Figure 5, a pair of conductor prongs or studs 33a and 34a are mounted in electrically insulated relation to one another in the housing 28 and are connected to the terminals 33b and 34b. The studs or prongs 33a and 34a extend outwardly into an outwardly opening recess 35 formed in the periphery of the housing 28. The periphery of the housing 28 is also provided with an outwardly opening notch 36 which engages a lug 37 which extends inwardly from a portion of the wall 11 for non-turnably mounting the heater element 27 in the bottom portion of the casing 9 properly positioned so that the recess 35 will align with an opening 38 of the wall 11, which is circumferentially spaced from the slot 21.

An elevator unit, designated generally 39, includes a receptacle, designated generally 40, including a substantially flat bottom 41 and a surrounding upstanding wall 42, which is preferably cylindrical. The bottom or platform 41 is provided with a series of openings or perforations 43. A portion of the upstanding wall 42 is provided with a vertical extension 44, as best seen in Figures 2 and 4. The elevator unit 39 also includes a handle 45 formed of a heat insulating material to which a pair of bolts 46 are secured in vertically spaced relation to one another. Said bolts 46 extend inwardly from the handle 45 loosely through the slot 21. The inner ends of the bolts 46 are secured as by clamping nuts 47 or in any other suitable manner to the receptacle 40, the lower bolt 46 being secured to the wall 42 and the upper bolt preferably being secured to the extension 44. A plate 48 is secured to the inner side of the handle 45 and crosswise thereof by the lower bolt 46. As seen in Figure 3, the width of the handle 45 is less than the spacing between the flanges 24. The plate 48 extends outwardly a substantial distance from each side of the handle 45 and the bottom edge thereof is adapted to engage the upwardly facing rests 25, as seen in dotted lines in Figure 2, in an elevated position of the unit 39.

The socket end 49 of a conventional electric cord 50 is adapted to be inserted through the opening 38 into the recess 35 to receive the prongs or studs 33a and 34a to supply electric current to the heating element 32 when the heater and cooker 8 is to be used. The lid 14 is then removed and the handle 45 is grasped to raise the elevator unit 39 from its full line to its dotted line position of Figure 2, said unit being displaced inwardly with respect to the casing 9 when elevated, so that the plate 48 will be disposed to engage on the rests 25 to maintain the unit 39 in its dotted line position of Figure 2. The bolts 46 are of sufficient length between the handle 45 and the receptacle 40 to accommodate this radial movement of the elevator relative to the casing 9, and the receptacle 40 is sufficiently smaller in diameter than the casing 9 to permit it to be displaced diametrically of the casing between its full and dotted line positions for engaging the plate 48 on or for disengaging said plate from the rests 25. With the elevator 39 supported on the rests 25 as seen in dotted lines in Figure 2, a container containing a food to be cooked or heated is inserted through the open top 12 into the receptacle 40 and is supported on the receptacle bottom 41. Such a container is illustrated in Figure 2 as a can of the type in which many foods are conventionally sold. Before the can 51 containing the food is applied to the receptacle 40, as previously described, the top is removed from the can and the label is preferably removed. The handle 45 is then grasped, lifted slightly and displaced away from the casing 9 so that the plate 48 will clear the flanges 24. The elevator unit 39 is then lowered by the handle 45 until the bottom 41 comes to rest upon the upper ends of the insulators 30, after which the lid 14 is replaced. The heating unit 27 will rapidly cook or heat the contents of the can 51, after which the lid 14 is removed and the elevator unit 39 is returned to its dotted line position of Figure 2. The can 51 may then be removed by grasping the upper portion of the can with a pair of tongs or with a pot holder, or in any other suitable manner.

It will also be noted that the extension 44 and the wall portion 42 disposed therebeneath substantially cover the slot 21 in the lowered position of the receptacle 40.

It will also be apparent that other types of containers in which food is conventionally sold and which are not readily subject to breakage due to heat, may be applied to the receptacle 40 in the same manner as the can 51 for heating or cooking the contents of such containers.

Various modifications and changes are contemplated and may obviously be resorted to, without departing from the spirit or scope of the invention as hereinafter defined by the appended claims.

I claim as my invention:

1. A cooker and heater of the character described comprising a casing having an open top, a heating unit mounted in the bottom of said casing, an elevator structure including an upwardly opening receptacle having a flat bottom, said receptacle being loosely disposed in said casing and being adapted to support therein a food container for cooking or heating the contents thereof, said elevator including a handle disposed externally of the casing and adapted to be manually grasped for raising and lowering the receptacle and for moving said receptacle radially of the casing, said casing having a vertically elongated slot, and connecting elements extending loosely through said slot and connecting the handle and receptacle in spaced apart relation to one another, the bottom of said receptacle resting on portions of the heating unit for supporting the elevator structure in a lowered position, a lid detachably mounted on and closing the open top of said casing when said elevator structure is in a lowered position, supporting means mounted on the outer side of said casing, and a member carried by said handle and adapted to rest on said supporting means for supporting the elevator structure in a raised position adjacent the open top of said casing when said elevator structure is raised and displaced radially inward of the casing.

2. A cooker and heater as in claim 1, said supporting means comprising brackets straddling said slot and extending outwardly from said casing.

3. A cooker and heater as in claim 1, said heating unit portions constituting the upper ends of a plurality of electrical insulator elements, said insulator elements having means disposed beneath and adjacent said upper ends for supporting the heating element of the heating unit beneath and in close proximity to the upper ends thereof.

4. A cooker and heater as in claim 1, said receptacle including an upstanding wall having a restricted extension projecting upwardly from a portion thereof and combining with the wall portion disposed therebeneath to substantially close the casing opening formed by said slot when said elevator structure is in a lowered position.

5. A cooker and heater as in claim 1, said casing having an opening adjacent the bottom thereof adapted to receive the socket end of an electric extension cord, and means for orienting the heating unit within the casing for positioning socket engaging electrical contacts of the heating unit substantially in radial alignment with said casing opening.

References Cited in the file of this patent

UNITED STATES PATENTS

| | | |
|---|---|---|
| 2,278,994 | Kempton | Apr. 7, 1942 |
| 2,695,352 | Dikold | Nov. 23, 1954 |
| 2,709,215 | Miller | May 24, 1955 |
| 2,735,925 | Nickolay | Feb. 21, 1956 |